United States Patent [19]

Bac

[11] Patent Number: 5,067,690
[45] Date of Patent: Nov. 26, 1991

[54] SELF-CLOSING DEVICE FOR CONNECTING CONTAINERS

[75] Inventor: Jean-Claude Bac, Le Petit Couronne, France

[73] Assignee: Aerazur, France

[21] Appl. No.: 487,475

[22] Filed: Mar. 2, 1990

[30] Foreign Application Priority Data

Mar. 3, 1989 [FR] France .................. 89 02947

[51] Int. Cl.⁵ .......................................... F16L 37/28
[52] U.S. Cl. ................. 251/149.8; 137/38;
137/67; 137/899.2; 244/135 R
[58] Field of Search ............... 244/135 R; 137/38, 67, 137/68.1, 899.2; 251/149.8

[56] References Cited

U.S. PATENT DOCUMENTS

| 2,157,881 | 5/1939 | Andreasen | 251/149.8 |
|---|---|---|---|
| 2,666,656 | 1/1954 | Bruning | 244/135 R |
| 3,537,477 | 11/1970 | Mahoff | 244/135 R |

FOREIGN PATENT DOCUMENTS

| 1444034 | 9/1966 | France . | |
|---|---|---|---|
| 2456277 | 12/1980 | France . | |
| 26271 | 2/1969 | Japan | 137/67 |
| 552722 | 4/1943 | United Kingdom | 244/135 R |
| 8900262 | 1/1989 | World Int. Prop. O. | 137/67 |

*Primary Examiner*—A. Michael Chambers
*Attorney, Agent, or Firm*—William A. Drucker

[57] ABSTRACT

A device is disclosed for self-sealing connection between containers having a flexible wall bearing on a rigid (1) or thin (1') partition, through which passes a connecting sleeve (3) having a fold inside the container, which a tractive force separating the containers seals, before breakage of the cylindrical barrel (6), by means of a jamming element (9, 13), after causing the fold (5) to turn back over the orifices of a tube section (10).

9 Claims, 3 Drawing Sheets

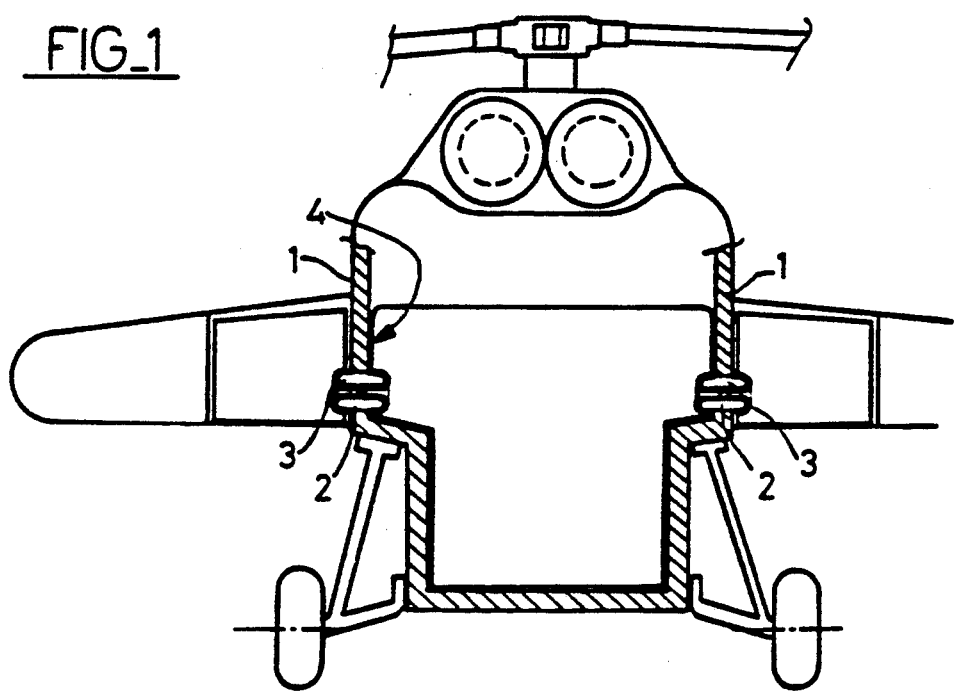
FIG_1
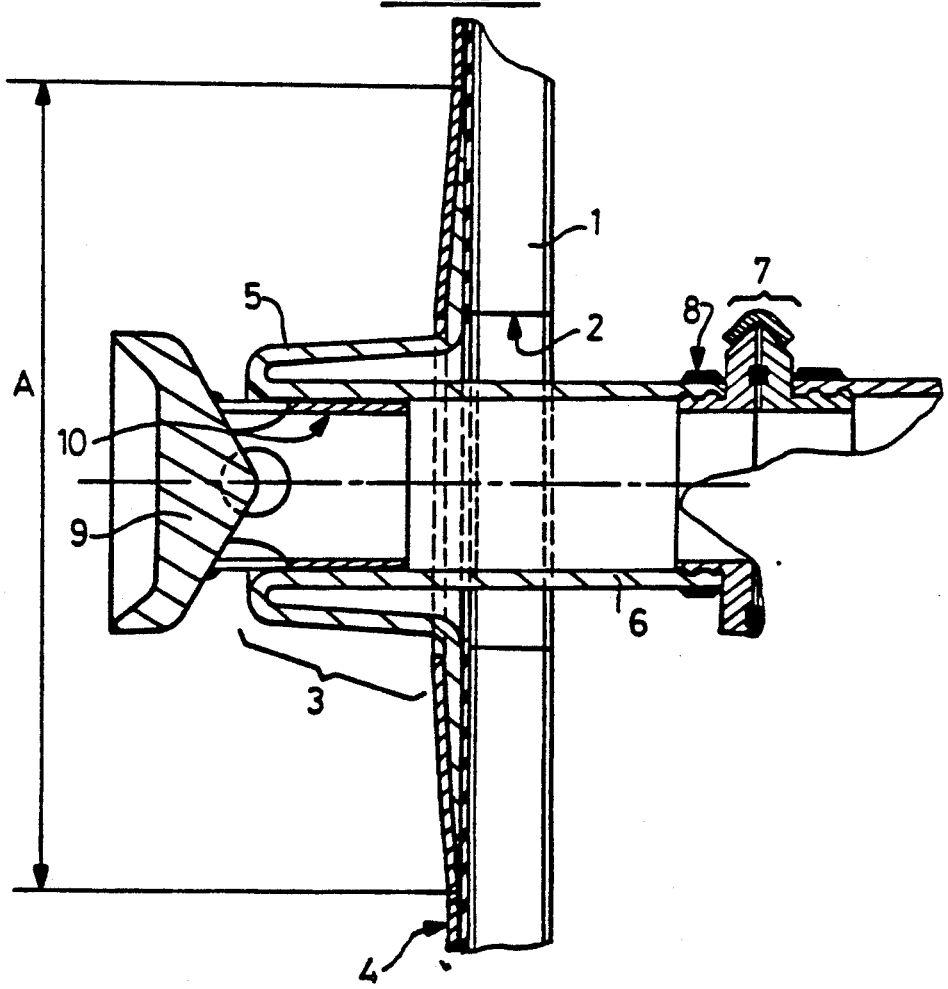
FIG_2

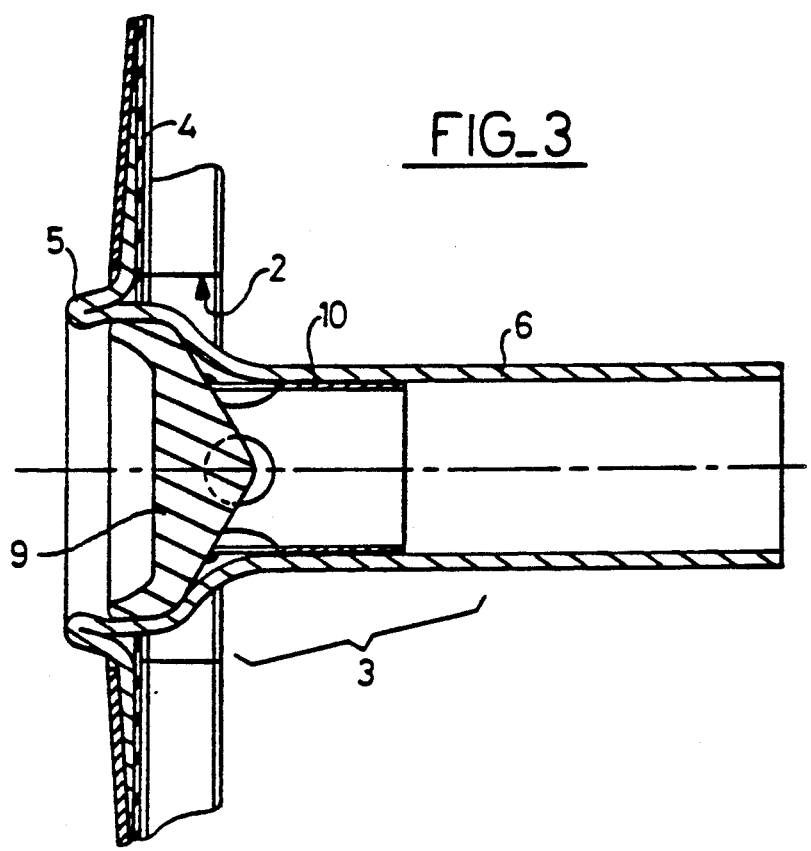
FIG_3
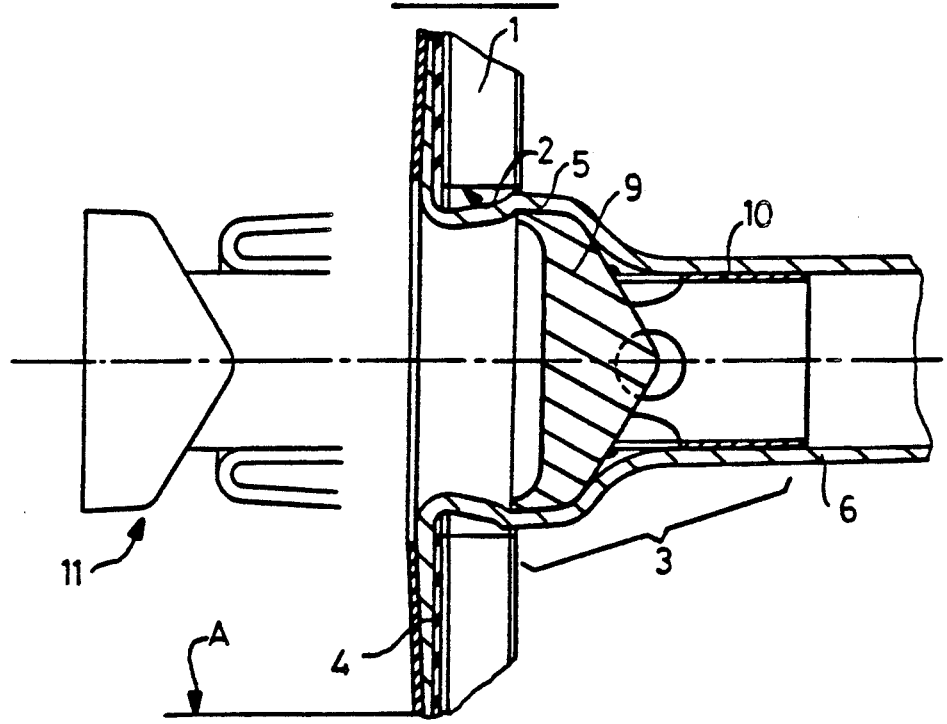
FIG_4

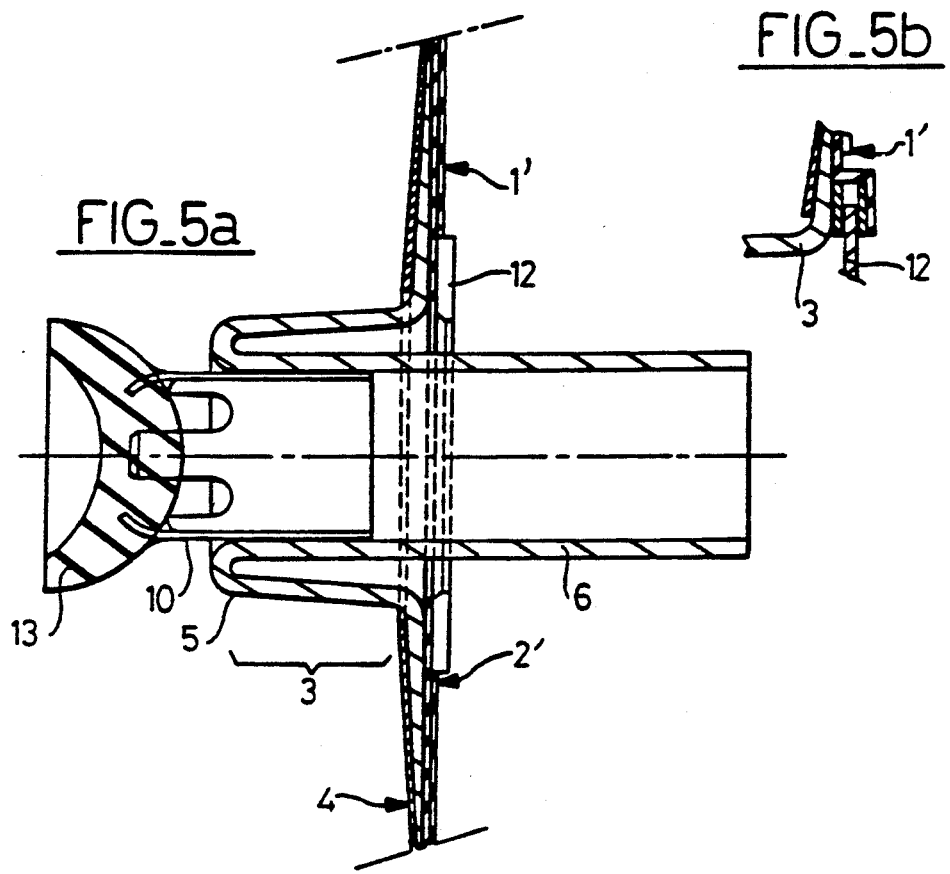
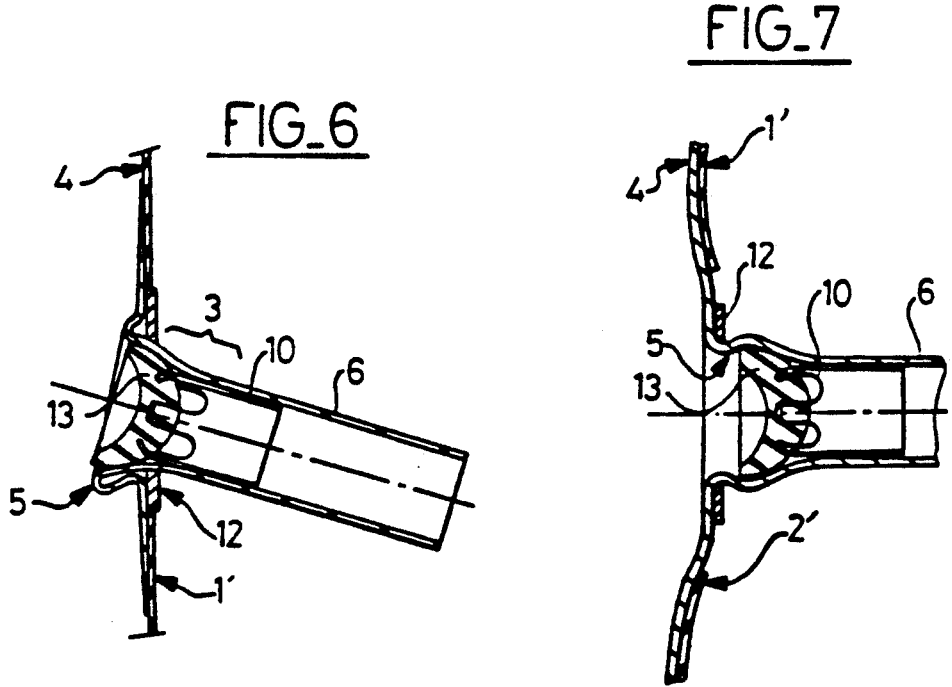

SELF-CLOSING DEVICE FOR CONNECTING CONTAINERS

The invention relates to containers, such as reservoirs, tanks or pipes connected together by a flexible connection. It is in the form of a safety device against shocks in a vehicle or aircraft on which the fuel tanks are provided with so-called anti-crash safety devices and may also be used on any flexible or rigid container containing a liquid dangerous for the environment.

In a rigid tank, the supply and often also the discharge pipes, forming for example a distribution network, must have a deformable zone accommodating rotational and deflection movements, formed by a member called expansion seal. The deflection movements are limited by the geometric performances of this seal which very often proves to be the source of breakage in an accident. The French patent 1 444 034 to Calorstat provides metal folds between concentric rings connecting together two rigid elements which thus accommodate angular variations.

In a rigid device such as this first family of containers, there exist safety valves of the type described in the review LAPIS of February 1965, where a valve closes the rigid connection orifice as soon as the connecting pipe is torn away. This technique requires all the mechanical and geometric arrangements to be made so that separation takes place by substantially axial traction on the connecting pipe, which is not always possible.

On the contrary, very flexible pipes may be safely connected to containers by a flexible sleeve such as that described in the U.S. Pat. No. 1,923,124 to STANLEY for vacuum pipes as long as the mechanical safety connections are provided otherwise. Similarly, in this family of containers connected flexibly to a pipe, the French patent 2 456 277 to KLEBER COLOMBES describes a communication of this type, characterized by a fold of flexible materials turned inwardly of the tank. The safety of fuel tanks for racing cars as well as for helicopters is appreciably increased by the possibility of geometric travel between the tanks thus connected together.

To the extent that the means for fixing to the rigid structure are equipped with so-called anti-crash damping devices, moreover known in the art, and that the flexible walls are adapted to withstand high deformation, safety is increased to the point where tearing occurs between the pipe and the tank. Such anti-crash tanks are defined by a flexible wall confined against rigid partitions fixed to the structure, through which partitions the flexible or rigid pipe passes.

The present invention completes such devices and has as objective to impose the succession of different events in an imperative order:
 first of all, deformation whose value is a measure of the gravity of the accident,
 then, sealing triggered by a geometrical travel criterion by means of an original device,
 finally, breakage of the connection, guaranteed to take place automatically only after sealing of the connection on both sides of the separation.

The device permitting such a procedure applies to containers having a flexible sleeve comprising an internal fold of flexible material. Any force exerted on said sleeve, because of the considerable travel distances permitted, is transformed into a tractive force in the alignment of the orifices of the containers, which offers, for example to two interconnected safety tanks, separated by a rigid partition forming part of the structure, much greater safety in the case of an accident.

The invention is then a self-sealing connection device between containers one of which has a flexible wall bearing against a rigid wall formed with a bore or against a thin partition formed with an opening, through which bore or opening a connecting sleeve is fixed on the container with flexible wall, via an internal fold made from a flexible material.

The invention is characterized in that a tractive force, exerted by the cylindrical barrel of the connecting sleeve and tending to move the containers apart, causes the internal fold to turn back over the orifices of a tube section and irreversible sealing of said connection, before breakage thereof, by a jamming element.

The invention and embodiments thereof will be better understood from the following description accompanying the drawings, in which:

FIG. 1 illustrates the application of the invention, by way of example, to the connection of tanks on a helicopter;

FIG. 2 shows in section through the axis the self-sealing connection device with a rigid valve, in the service position;

FIG. 3 illustrates the position of the same device, during sealing, before separation of the "fusible" elements;

FIG. 4 shows the same device during separation of the two protected containers;

FIG. 5a and 5b shows, also in axial section, a self-service connection device with flexible sealing means in the service position;

FIG. 6 shows the position of the same device during sealing by an associated rigid washer;

FIG. 7 shows this same device during separation of the protected containers.

FIG. 1 illustrates the application of the invention, for example to a helicopter whose rigid partitions 1 contain a main tank with flexible walls assuming the shape of the inner volume where it is confined, by bearing against said rigid partitions. They have passing therethrough, through bores 2, connecting sleeves 3 providing large section communication with complementary tanks contained in the side ailerons. Said complementary tanks provide an additional permanently connected capacity, during filling and during use. However, in the case of an accident such as a shock or a free fall, the fact that the connecting sleeves 3 pass through a rigid wall 1 represents an aggravating circumstance which limits the performances of the tank because of the danger of breakage. So that such a shock, moreover not violent enough to endanger the lives of the occupants, does not cause sudden conflagration of the aircraft, the device providing communication between the two tanks must not break, even if the tanks move or if a metal portion is projected on to said device. The self-sealing connection device thus makes possible the permanent connection between several tanks separated by rigid walls while providing total safety.

FIG. 2 is a partial section, in the service position, of the particular example of application of the invention to fuel tanks on a helicopter. This section is made through the axis of a connecting pipe which very often provides large section communication between two flexible tank elements separated by a rigid wall 1 forming part of the structure of the aircraft.

Formed of a honeycomb material, of appreciable thickness, between two metal skins, this rigid wall lets pass, with a possible clearance of several centimeters through a bore 2, the connecting sleeve 3 which emerges from the tank with flexible wall 4 and passes through one or more other partitions.

Said sleeve 3, known in the prior art, has a fold 5 situated inside the tank. It is generally formed of twisted textile cord coated with synthetic rubber, of a strength compatible with the fuel contained in the tank. A fold of twisted cords has a direction parallel to the generatrices in the cylindrical barrel 6 of the sleeve and expands during manufacture thereof over the bonding plane of the flexible walls 4 over a large bonding surface having a diameter A. In the cylindrical barrel 6 as also in the cylindrical portion of fold 5, circumferential twisted cords reinforce the connecting sleeve 3 in its substantially constant thickness which ends progressively in a bevel at the edge of bore A.

The tank with flexible walls 4 bears by all its faces on walls forming part of the structure such as the rigid partition 1 and, in case of a sudden shock, may slide to a certain extent over these walls, because of the damping provided by the anti-crash devices.

The cylindrical barrel 6 of the connecting sleeve 3 is connected either to a pipe or, as shown, to a similar tank situated on the other side of the rigid partition 1, through a rigid connection 7 providing sealed mechanical assembly.

The connecting sleeve 3 is fixed to said rigid connection 7, for example by a clamping collar 8, so that the assembly prepared on the tank may pass through bore 2 in the partition.

The device for self-sealing the connection, in accordance with the invention, is formed of a rigid valve 9, for example made from metal, aluminum or a light alloy and is fixed to a tube section 10 by welding or molding.

Said tube section 10, pierced with holes through which the fuel freely flows, is force fitted and positioned in the cylindrical barrel 6 of the connecting sleeve 3 where it is held by an appropriately mechanical means or by bonding. Small resilient movements of said connecting sleeve are made possible by a fold 5 rolling on itself.

FIG. 3 shows the phase for automatic sealing of the device, as soon as the tractive travel has exceeded a certain value. Up to then reversible, the tractive force exerted on the connecting sleeve 3 caused by the separation, whatever its direction, of the two tanks connected together via the cylindrical barrel 6 causes the opening situated on the tube section 10 to be covered. Beyond this stage, fold 5, still inside the tank, is engaged over the rigid valve by rolling on itself, because of the tension of the twisted cord structure parallel to the generatrices of said cylindrical barrel 6. Sealing is then total and irreversible (short of a recovery manoeuvre) because of the resilience of the reinforcement twisted cords disposed circumferentially on fold 5 which makes possible a local pressure of several bars for providing liquid tightness. Such engagement of the connecting sleeve 3, fitted on tube section 10, remains possible even under the effect of an oblique tractive force exerted via the twisted cords which follow the generatrices of the cylindrical barrel 6.

With sealing obtained, the tractive movement, even oblique, may continue as far as the position shown in FIG. 3, unless an oblique bearing force of the rigid valve 9, through the wall of the connecting sleeve 3 on bore 2 of the partition, has exerted a sufficient reaction to cause breakage of the "fusible" elements, formed, for example, by force fitting the cylindrical barrel 6 on the rigid connection.

FIG. 4 shows the phase of complete sealing of the connection at the moment of accidental separation of two tanks connected together by the connecting sleeve 3, after the extra thickness due to the rigid valve 9, surrounded by the completely turned over fold 5, has passed over bore 2 through the rigid partition 1. All the twisted cords following the generatrices are stretched and are anchored as far as diameter A by being bonded to the flexible wall 4.

In the extreme case, all the axial twisted cords participate in the traction over a periphery very much greater than that of the cylindrical barrel 6, where breakage will occur first. Either by voluntary interruption of the twisted reinforcement cords following the generatrices, or by a controlled mechanical friction device formed in the rigid connection 7, breakage is obtained on the cylindrical barrel 6 or in its immediate extension.

The small amount of dangerous liquid or fuel contained in the two safety valves thus formed may flow away and possibly be stopped by a spongy device of limited volume. Beyond breakage, the two tank elements may be moved apart without limit, from the moment when the integrity of their walls is provided by appropriate damping elements.

The available travel up to breakage, about a decimeter, follows from the service position 11, shown schematically with fine lines, with respect to the position sealed by the rigid valve 9.

FIG. 5 shows an axial section of a variant of the self-sealing connection device, with flexible seal, in the service position.

In FIG. 5a, to the wall formed of a thin partition 1' in this application, an associated washer 12 is fixed for guaranteeing the effect of the device, the washer being itself bonded to the flexible wall 4 of the container. In FIG. 5b, a floating arrangement of said associated washer 12 has been shown, allowing radial play. In both cases, said associated washer 12 is therefore supplied with the flexible container and is applied during fitting to the opening 2' of the thin partition 1'.

The self-sealing device is formed of a flexible seal 13 made from a synthetic elastomer compatible with the liquid in the container, bonded during vulcanization thereof to the tube section 10. The latter is pierced with liquid flow holes and is force fitted in the cylindrical barrel 6 of the connecting sleeve 3 where it may be fixed as in the preceding variant. Lighter than the preceding device, the flexible seal 13 forms, with said tube section 10, a solid reduced mass whose acceleration at the time of a shock exerts less deformation on the connecting sleeve 3.

FIG. 6 shows the beginning of sealing under the effect of an oblique tractive force received by the cylindrical barrel 6, connected by a connection not shown to another similar connecting sleeve.

By a beginning of reversible deformation, fold 5 of the connecting sleeve 3 covers first of all the liquid flow holes formed in tube section 10, then is engaged over the flexible seal 13 having a substantially hemispherical external shape. Even dissymmetric, the turned over portion of the fold 5, again disposed inside the tank, therefore fits over the flexible seal 13 before even appearing in the bore of the associated washer 12.

If it is stopped at this stage, the sealing manoeuvre is still reversible by a manual recovery operation because of the flexibility of fold 5 which has only slightly deformed the flexible seal 13.

FIG. 7 is an axial section illustrating the last stage of the variant with deformable valve such as the flexible seal 13 and the associated washer 12 at the moment of separation of the containers, made possible either by voluntary breakage of the twisted cords in the cylindrical barrel 6 or by controlled friction in the rigid connection.

Even if the thin partition 1', by its deformability, exerts too little acceleration at the time of an accident for controlling the automatic sealing manoeuvre, separation of the containers forces the bore of the associated washer 12, bonded to the flexible wall 4, to pass over the flexible seal 13, exerting this force through a single thickness of the connecting sleeve 3, which is already fitted over said flexible seal 13.

In fact, fold 5 is only caused to turn over totally, as shown, after the forced passage of the flexible seal 13 through the associated washer 12. The resilience provided by the textile reinforcement cords which form said fold 5 permit the contraction shown over a more reduced diameter than that of the flexible seal 13, which provides the pressure required for sealing.

Prior to the position shown, the diametrical indeformability of the associated washer 12, whose bore is substantially close to the external diameter of the flexible seal 13, has forced this latter to contract diametrically by about twice the thickness of the connecting sleeve 3.

The considerable reaction exerted causes, because of this factor, separation of the containers. This force is transmitted by the longitudinal textile reinforcement twisted cords in the cylindrical barrel 6, themselves anchored by a large bonded surface on the flexible wall 4 of the container, even though the thin partition 1' has exerted an insufficient reaction and has become deformed as shown. The connection thus provides safety for locking the seal in the case where the insufficient resistance of the thin partition 1' might let the flexible wall 4 be engaged in its opening 2', with too low a reaction and the risk of tearing said flexible wall 4, beyond the sealed zone.

Such a situation would occur if, under the effect of the tractive force, the flexible tank tended to crease and to pass through opening 2'. The latter, then torn, would become aggressive for the flexible wall 4.

The associated washer 12 therefore permits a clean breakage of the connection by means of a "fusible" zone which only breaks after the sealing operation.

The self-sealing device associated with a flexible sleeve with a fold inside the container forms, with this container, a monobloc assembly. It does not modify the procedure of positioning a flexible container in the free inaccessible spaces of a vehicle or aircraft structure. The flexibility of the sleeve and the reversible part of the sealing operation allow the sleeves to be assembled by conventional methods using collars or mechanical assembly connections.

Moreover, the replacement of an elementary container is not modified by the presence of the self-sealing device.

Besides the evident safety provided by the succession, in the imperative order, of the steps for deforming, sealing and breaking the connection, limiting the risks to the flow of a very small amount of liquid, at the time of a considerable shock, the self-sealing connection device of the invention has the following advantages:

it guarantees the flexibility of the connection between two containers since it comprises no rigid part forming said connection;

it lightens the assembly by limiting the number of metal, therefore heavy, parts;

it makes possible broader tolerances for the openings and positioning;

it facilitates positioning of the assemblies of containers, because of its flexibility;

it transfers to a higher level the intrinsic safety required for safety tanks.

A man skilled in the art may of course make different modifications to the self-sealing connection device of the invention and, in particular, combine the different variants of forms and dimensions, without departing from the scope of the invention.

I claim:

1. Device for self-sealing connection between plural containers, at least a first of said containers having and a flexible wall with an internal wall surface bearing against a partition pierced with a bore, which comprises:
   (a) a flexible connecting sleeve having an end fixed to said internal wall surface of said first of said containers and around said opening thereof, said connecting sleeve presenting a fold within said first container and having a cylindrical barrel at the opposite end thereof which passes through said bore of said partition and is connected to another of said plural containers;
   (b) a tube section and a sealing element disposed within said first container comprising a jamming element contained by said tube section force fitted into said cylindrical barrel in the vicinity of said fold, said tube section having holes therethrough through which a container fluid can freely flow from one of said containers to another of said containers;
   (c) said fold of said connecting sleeve turning back over said holes of said tube section responsive to a tractive force exerted on said cylindrical barrel of said connecting sleeve tending to move said containers apart to cause an irreversible sealing of the connection.

2. Device according to claim 1, wherein said partition against which said flexible wall of said first container bears is a rigid partition, said jamming element is a rigid valve having a connecting sleeve, said jamming element, under the action of said tractive force, forcibly passing through the bore of said rigid partition.

3. Device according to claim 1, further including a washer bonded to said partition, wherein said partition against which said flexible wall of said first container bears is a thin partition, said jamming element being a flexible seal having a connecting sleeve, said jamming element, under the action of said tractive force, forcibly passing through said washer.

4. An assembly of two tanks each having a flexible wall, each of said two tanks being connected to a device for self-sealing connection according to claim 1, each of said devices for self-sealing connection being connected by a rigid connection.

5. An assembly of two tanks each having a flexible wall, each of said two tanks being connected to a device for self-sealing connection according to claim 2, each of said devices for self-sealing connection being connected by a rigid connection.

6. An assembly of two tanks each having a flexible wall, each of said two tanks being connected to a device for self-sealing connection according to claim 3, each of said devices for self-sealing connection being connected by a rigid connection.

7. An assembly of a container having a flexible wall and of a pipe, said container being equipped with a device for self-sealing connection according to claim 1 and said pipe being connected to said device for self-sealing connection by means of a rigid connection.

8. An assembly of a container having a flexible wall and of a pipe, said container being equipped with a device for self-sealing connection according to claim 2 and said pipe being connected to said device for self-sealing connection by means of a rigid connection.

9. An assembly of a container having a flexible wall and of a pipe, said container being equipped with a device for self-sealing connection according to claim 3 and said pipe being connected to said device for self-sealing connection by means of a rigid connection.

* * * * *